United States Patent [19]
Langen et al.

[11] Patent Number: 5,462,303
[45] Date of Patent: Oct. 31, 1995

[54] SIDE STRUT FOR A LOWER STEERING ARM OF A TRACTOR

[75] Inventors: Hans-Jürgen Langen, Frechen; Jürgen Vollmer, Lohmar; Andreas Sarfert, Bonn, all of Germany

[73] Assignee: GKN Walterscheid GmbH, Lohmar, Germany

[21] Appl. No.: 218,113

[22] Filed: Mar. 25, 1994

[30] Foreign Application Priority Data

Mar. 27, 1993 [DE] Germany ............... 43 10 027.9

[51] Int. Cl.$^6$ ................................. A01B 59/041
[52] U.S. Cl. .................. 280/455.1; 172/450; 292/278; 403/325
[58] Field of Search .................. 180/53.3; 280/455.1; 188/300; 267/64.12; 292/213, 267, 274, 278; 172/450; 403/325, 322, 321, 330

[56] References Cited

U.S. PATENT DOCUMENTS

| | | | |
|---|---|---|---|
| 4,865,134 | 9/1989 | Rugen et al. | 172/450 |
| 5,361,850 | 11/1994 | Müller et al. | 292/278 |

FOREIGN PATENT DOCUMENTS 2727131  12/1978  Germany ..................... 172/450

Primary Examiner—Kenneth R. Rice
Assistant Examiner—Paul N. Dickson
Attorney, Agent, or Firm—Harness, Dickey & Pierce

[57] ABSTRACT

A side strut 6 for the lower steering arm of a three-point attaching device of a tractor is telescopic and has a first telescopic member 14 and a second telescopic member 15 which are able to carry out relative movements relative to one another along an adjustment axis 16. A locking pawl 19 may allow maximum possible relative movement or a limited amount of travel. Complete locking is also possible. For setting the various positions which the locking pawl 19 is able to assume relative to the telescopic members 14, 15, a fixing device 31 is provided which takes account of the respective stop regions 24, 30 for the locking pawl 19 or which, for the purpose of allowing the entire relative movement between the maximum limits, may be disengaged from the locking stops 23. This measure, in addition to permitting standard adjustment within the limits of the usual floating movement, allows a limited floating movement. Furthermore, it achieves complete locking and fixing in this position.

4 Claims, 6 Drawing Sheets

SIDE STRUT FOR A LOWER STEERING ARM OF A TRACTOR

BACKGROUND OF THE INVENTION

The invention relates to a side strut for a lower steering arm of a three-point attaching device of a tractor. The strut includes a first articulating telescopic member secured to the tractor and a second articulating telescopic member secured to the lower steering arm. The two telescopic members are adjustable relative to one another along an axis of adjustment between an inserted position and a maximum extracted position. The side strut further includes a locking pawl which is attached to one of the two telescopic members. The pawl is pivotable around an axis intersecting the axis of adjustment at right angles. The pawl includes two parallel cheeks arranged at the sides of the two telescopic members and connected to one another by a bridge. The side strut also includes two locking stops which extend transversely relative to the axis of adjustment. The stops project from the other of the two telescopic members and are form-fittingly embraced by locking recesses when the locking pawl is in a locking position.

Side struts are known from DE 41 18 683 C1, issued May 27, 1992. In the case of the embodiment described therein, the movement between the telescopic members is limited by a longitudinal slot in the two cheeks of the locking pawl.

SUMMARY OF THE INVENTION

It is an object of the invention to provide a side strut which, in addition to locked positions, includes floating positions with different adjustable paths.

In accordance with the invention, the objective is achieved by, in addition to the locking recesses, the cheeks of the locking pawl including one or several extending steps. A fixing device is provided which serves to position the locking pawl relative to the locking stops.

Such design measures ensure, in addition to the standard adjustable path, that a limited floating movement can easily be set and that such a setting can easily be released.

As a function of the position of the lower steering arms the locked position is achieved automatically, thereby preventing any lateral floating of the lower steering arms. The locking pawl is normally actuated by a pulling element provided at a fixed point at the rear of the tractor. A spring is attached between the locking pawl and the pulling element (e.g. a rope) and permits a relative movement between the fixed point and the lower steering arms, however, the position of the locking pawl relative to the telescopic members of the side strut is influenced by the spring. For example, by using the fixed point for attaching purposes, it is ensured that in the lowered position of the lower steering arms, the locking pawl assumes the selected floating position, a maximum floating distance or a limited floating distance. In the raised position, the locking pawl assumes the locked position relative to the telescopic members. The raised position, for example corresponds to the transport position of an attached implement for driving on a road. In such a condition it is desirable to prevent the floating movement to guide the lower steering arms rigidly to prevent the implement and the lower steering arms from hitting the wheels.

In a preferred embodiment, the telescopic member to which the locking pawl is pivotably attached includes a holding device which is arranged between the two cheeks of the locking pawl. The holding devices project through an aperture in the bridge and is provided with plug-in bores which may optionally be used for inserting a plug, with the outer face of the bridge being made to rest thereagainst.

The plug in connection with the holding device ensures that in each case, the maximum possible pivoting position of the locking pawl relative to the telescopic members is limited. For example, it is possible to set a position where the greatest possible floating distance between the telescopic members may be covered. The floating distance may be limited by inner stops between the two telescopic members. However, if the lower steering arms are raised, the locking position may be assumed. In a further setting position of the plug at the holding device, the movement may be limited in such a way that the stop faces of the extending step are located within the range of movement of the locking stop permitting limited adjustment of the two telescopic members relative to one another. In a third position, the locking pawl is positioned by the plug relative to the telescopic members such that, in the locked position, the locking stop is embraced by the locking recesses of the locking pawl with no telescopic movement permitted between the telescopic members. In this case, the locking pawl cannot be pivoted relative to the telescopic members.

Furthermore it is proposed that in the respective operating positions of the locking pawl and the locking stops relative to one another, the side faces of the locking recess and/or the stop faces of the extending step(s) extend parallel to the opposed contact faces of the locking stops.

This measure ensures planar contact when the locking pawl is positioned relative to the locking stops, which results in a reduction in loads.

To secure the two telescopic members relative to one another and to prevent them from rotating relative to one another, the telescopic member, which includes the locking stops, has a rotation limiting stop projecting into the space between the two cheeks of the locking pawl.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

DETAILED DESCRIPTION OF THE PREFERRED EMBODIMENT

Figure 1:
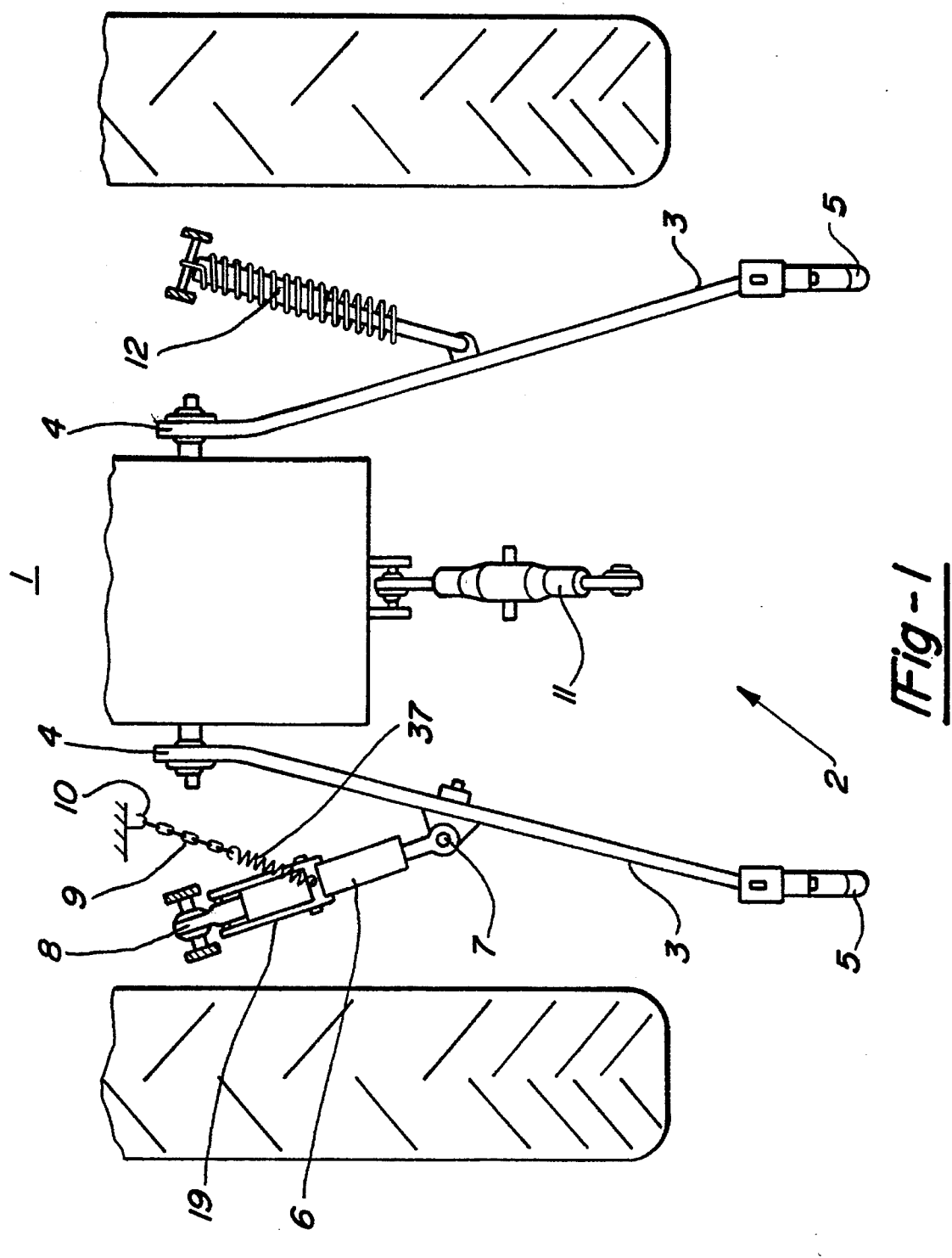
FIG. 1 is a plan view of the rear end of a tractor having a three-point attaching device, with the lower steering arms being in the lowered position.

FIG. 1 shows a rear end of a tractor 1 provided with a three-point attaching device 2. The attaching device includes two lower steering arms 3 attached to the tractor rear and pivotable around the articulation points 4. The lower steering arms 3 are attached, so as to be offset, on different sides of the longitudinal axis of the tractor 1. The coupling hooks 5 serve to accommodate the respective bearing regions of the implement to be attached.

One of the two lower steering arms is supported on the rear end of the tractor 1 by a side strut 6. The articulation point 8 permits the side strut to pivot around an axis located on the extension of the axes of the two articulation points 4. The other end of the side strut 6 is connected to the associated lower steering arm 3 by articulation point 7. The articulation axis of the articulation point 7 extends at an angle of 90° relative to the articulation point 8 so that the side strut 6 is able to follow the pivot movement of the lower steering arm 3 around the articulation point 4 in an upward direction as well as the lateral pendulum movements.

The length of the side strut 6 is adjustable, but the degree of telescopability may be varied by a locking mechanism. However, telescopability may also be eliminated to prevent an implement attached to the three-point attaching device 2 from carrying out pendulum movements. Such rigid lateral guidance may be desirable to guide implements accurately, for instance those used for producing furrows, such as hoeing devices or the like. However, in principle, such a locked position is always required when the implement is in the raised transport condition. The objective is to prevent any lateral oscillating movements of the implement from adversely affecting the driving behavior of the tractor 1 and to prevent the lower steering arms 3 from hitting the rear wheels of the tractor 1. Only one lower steering arm 3 requires a side strut 6 because the other lower steering arm 3 is kept at a distance by the implement. However, to brake lateral floating in the floating position, it is possible to provide a resilient side stabilizer 12 which, similarly to the side strut 6, is secured to the other lower steering arm 3 and tractor 1, respectively.

The purpose of the side stabilizer 12 is merely to set a preferential position and dampen oscillatory movements. Starting from this position, it permits resilient movability. The spring effects a return into the starting position in those cases, for example, where the side strut 6, too, is in the floating position. Floating positions are desirable in the case of implements guided on the ground, such as ploughs.

The three-point attaching device also includes an upper articulating steering arm 11 which is attached to the rear of the tractor 1 and which may be connected to the upper articulation point of an implement. The locking pawl associated with the side strut 6 is operated by a pulling element 9 connected to the locking pawl 19 by means of a spring 37. The pulling element 9 may be a chain for example. Attachment may take place in different positions at a fixed point 10 at the rear of the tractor 1. Although the pulling element 9 is attached at the fixed point 10, the spring 37 arranged between the pulling element 9 and the locking pawl 19 permits a relative movement of the side strut 6 relative to the fixed point 10, but as a function of the position of the lower steering arm 3, it influences the position of the locking pawl 19 relative to the telescopic members of the side strut 6.

Figure 2:
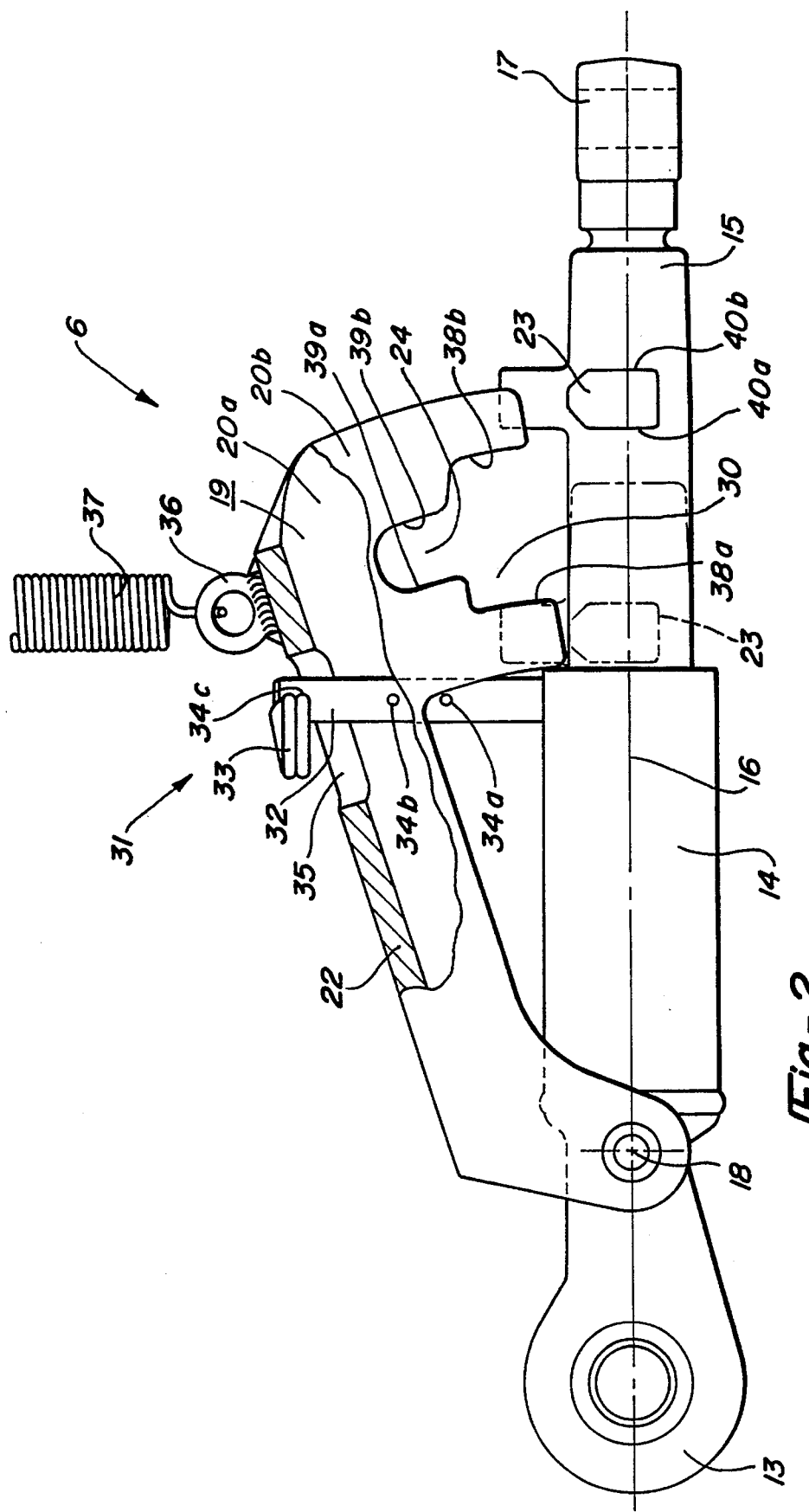
FIG. 2 is a plan view of a side strut with the locking pawl positioned relative to the telescopic member to permit maximum possible floating distance.
Figure 3:
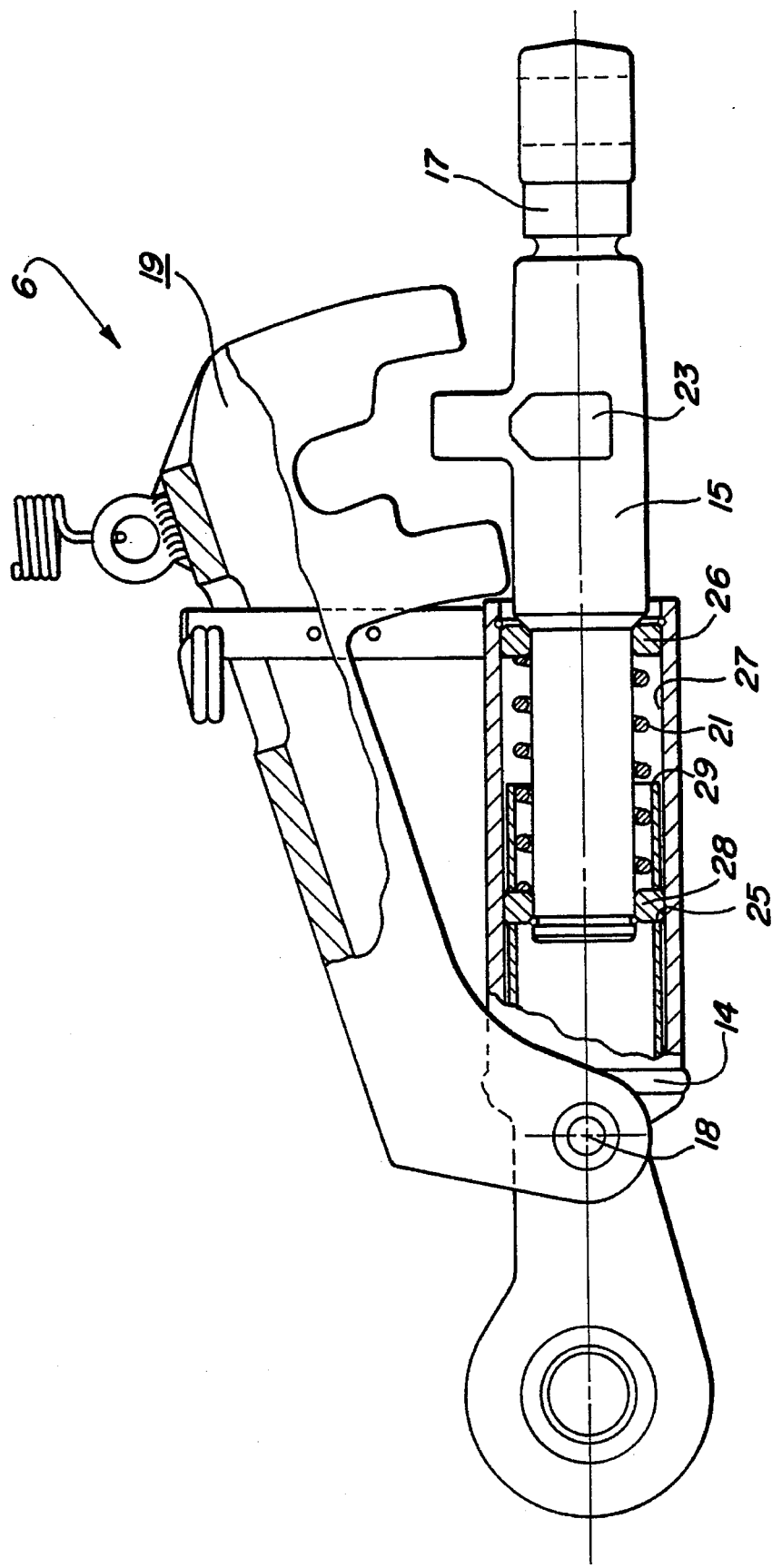
FIG. 3 is a plan view with a longitudinal section through the side strut according to FIG. 1.

FIGS. 2 and 3 show the design of the side strut 6 in greater detail. The side strut 6 includes a first telescopic member 14 provided with a spherical eye 13 which may be connected to the articulation point at the tractor end. The spherical eye 13 enables the side strut 6 to carry out a three-dimensional movement. The second telescopic member 15 is adjustably held in the first telescopic member 14 along an axis of adjustment 16. The second telescopic member 15 includes a connecting head 17 which is received in a connecting part to be secured to the lower steering arm. A locking pawl 19 is pivotally arranged at the first telescopic member 14 about a pin 18 constituting the pivot axis. The locking pawl 19 includes two cheeks 20a, 20b which extend along the sides of the telescopic members 14, 15 and parallel to the axis of adjustment 16 and which are connected to one another by a bridge 22 so that a U-shape is obtained if viewed in cross-section.

At the end of the locking pawl 19 facing away from the pin 18, the cheeks 20a, 20b are each provided with a locking recess 24 which is U-shaped and open at its lower end to be guided by a locking stop 23. Two locking stops 23 are provided projecting substantially radially from the second telescopic member 15. The two side faces of the locking recess 24 have been given the reference numbers 39a and 39b. They are spaced in such a way that they extend over the sides of the associated locking stop 23 leaving a small amount of play. The side faces 39a, 39b are arranged in such a way that when the locking recesses 24 embrace the associated locking stops 23, the resulting contact is of a planar nature. The side faces 39a and 39b then extend parallel to the two contact faces 40a, 40b of the locking stops 23. An extending step 30 which is also open is arranged in front of the locking recess 24. The extending step 30 includes two stop faces 38a, 38b, with the stop face 38a of the contact face 40a cooperating with associated locking stop 23 and the stop face 38b cooperating with the opposed contact face 40b of the associated locking stop 23 in order to limit the adjustable movement of the second telescopic member 15 relative to the first telescopic member 14 in the direction of the axis of adjustment 16.

As already described in connection with FIG. 1, the locking pawl 19 is moved or held at the fixed point 10 by a spring 37 and a pulling element 9. The various positions which the locking pawl 19 is able to assume relative to the two telescopic members 14, 15 and the locking stops 23, are determined by the fixing device 31. The fixing device 31 includes a holding device 32 which is secured to the first telescopic member 14 which also carries the locking pawl 19.

The holding device 32 projects upwardly from the outer contour of the first telescopic member 14 in the direction of the bridge 22 of the locking pawl 19. From the locking pawl 19, the holding device 32 extends upwardly through an aperture 35 in the bridge 22. The holding device 32 is provided with plug-in bores 34a, 34b, 34c which are arranged at different distances from the axis of adjustment 16 and which may be used to limit the pivot angle assumed by the locking pawl 19 relative to the axis of adjustment 16 of the two telescopic members 14, 15. By inserting a plug 33 into one of the plug-in bores 34a, b or c, it is possible to limit the pivot angle of the locking pawl 19 in an upward direction under the force of the spring 37, such limiting action being achieved by the bridge 22 stopping against the plug 33. One end of the spring is attached to an eye 36 secured to the bridge 22, with its other end being engaged by the pulling element 9.

The plug 33 may be provided in the form of a spring plug. The plug 33 includes two arms one of which is introduced into one of the plug-in bores 34a, b, c, and the other one is shaped in such a way that the plug 33 cannot be lost when held at the holding device 32. The holding device 32 is preferably designed like a cylindrical pin.

In the case of the position as illustrated in FIGS. 1 and 2, the locking pawl 19 is in its outermost pivot position relative to the upper edges of the locking stops 23, so that these can be moved freely outside the outer contour of the cheek parts of the locking pawl 19 including the extending step 30 and the locking recess 24. The dashed lines indicate the furthest possible position into which the locking stop 23 can be inserted. The position of the locking stop 23 shown in continuous lines corresponds to the maximum position up to which the two telescopic member may be extracted from one another.

To limit the movement, the second telescopic member 15 is adjustably guided in the bore 27 of the first telescopic member 14. The second telescopic member 15 includes a ring with a first stop 28 whose lefthand end face, in the inserted position, comes to rest against the first stop face 25 which forms part of a sleeve inserted into the first telescopic member 14. The ring, including the first stop 28 of the second telescopic member 15, is held by a securing ring on the part of the second telescopic member 15. The second telescopic member is in the form of a cylindrical shank which supports one end of a spring 21 whose other end is supported on the second stop 26 of the first telescopic member 14. The two telescopic members 14, 15 are thus pressurized into a preferential position from where it is possible to achieve further shortening towards the inserted position because the second stop 26 of the first telescopic member 14 is axially movably guided in the bore 27 of the first telescopic member and only in its outermost righthand position is it held by a securing ring. From this position it is also possible to achieve a telescopic movement in the sense of extending the side strut 6 and thus moving, for example, the second telescopic member 15 from the position as illustrated in FIG. 2 towards the right relative to the first telescopic member 14. The movement may continue until the second stop 29 of the second telescopic member 15, which forms part of a sleeve and is moved together with the first stop, comes to rest at the second stop 26 of the first telescopic member 14. The most shortened position of the two telescopic members 14, 15 may be achieved in that, starting from the position as is illustrated in FIG. 2, the second telescopic member 15 is moved towards the left and thus, by means of a stop face, drives along the second stop 26 of the first telescopic member 14. In the process, the second telescopic member 15 may move axially in the ring with the first stop 28 of the second telescopic member being held in position by the sleeve with a first stop 2S of the first telescopic member, until the second stop 26 of the first telescopic member 14 comes to rest on the second stop face 29, which forms part of a sleeve.

Figure 4:
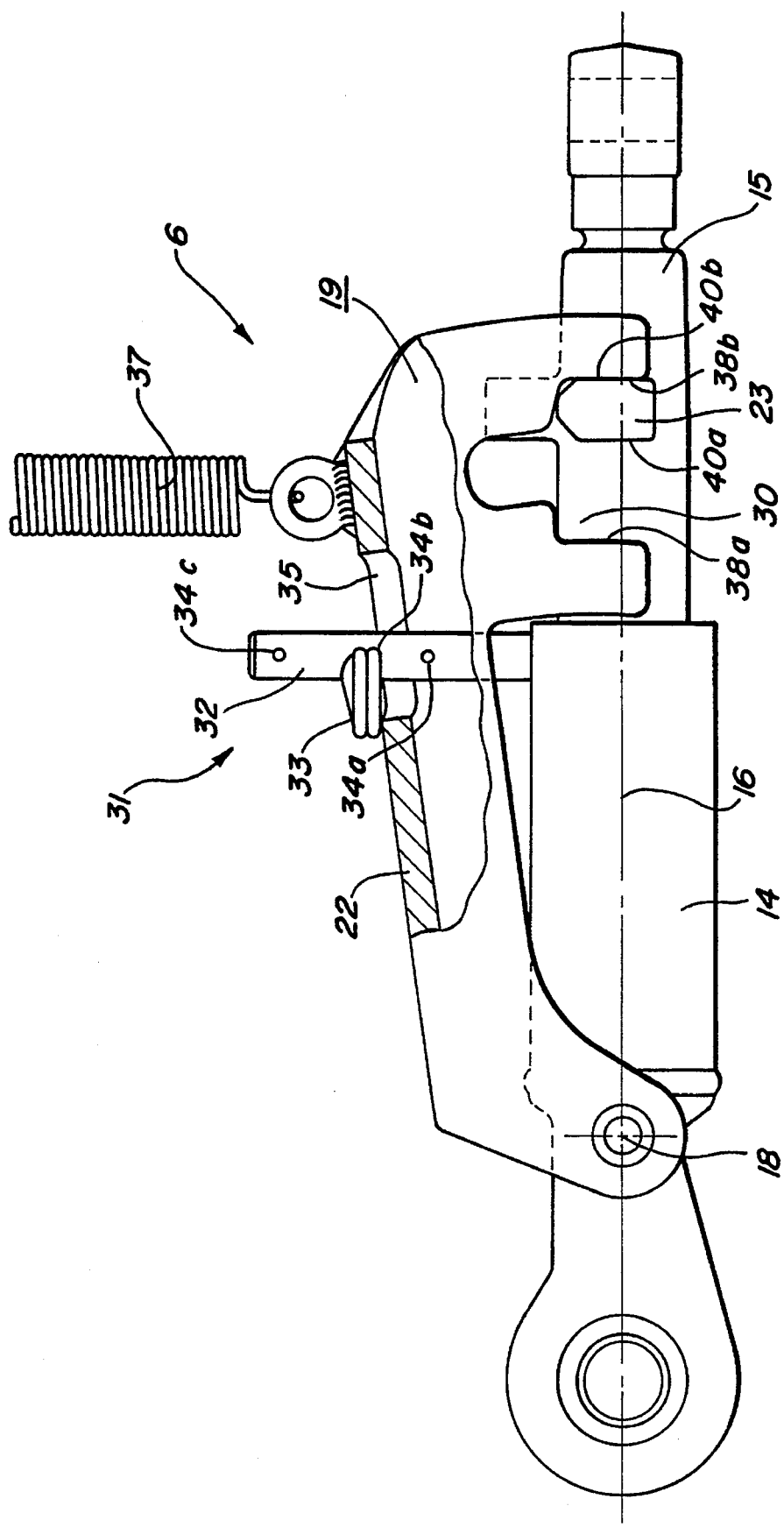
FIG. 4 is a plan view partially in section of a side strut with the locking pawl in a position limiting floating movement between the two telescopic members.

FIG. 4 shows a further plug position where the floating position is limited. The plug 33 engages the plug-in bore 34b. By means of the tensioned spring 37, the outer face of the bridge 22 is held in contact with the plug 33. The locking pawl 19, with its extending steps 30 in its two cheeks 20a, 20b, is positioned in the operating path of the two locking stops 23, permitting a limited adjustable movement between the first telescopic member 14 and the second telescopic member 15 along the axis of adjustment 16. The degree of adjustment is determined by the distance between the two opposed faces 38a and 40a, with the faces 38a being associated with the cheeks of the locking pawl 19 and the faces 40a being associated with the locking stops 23.

Figure 5:
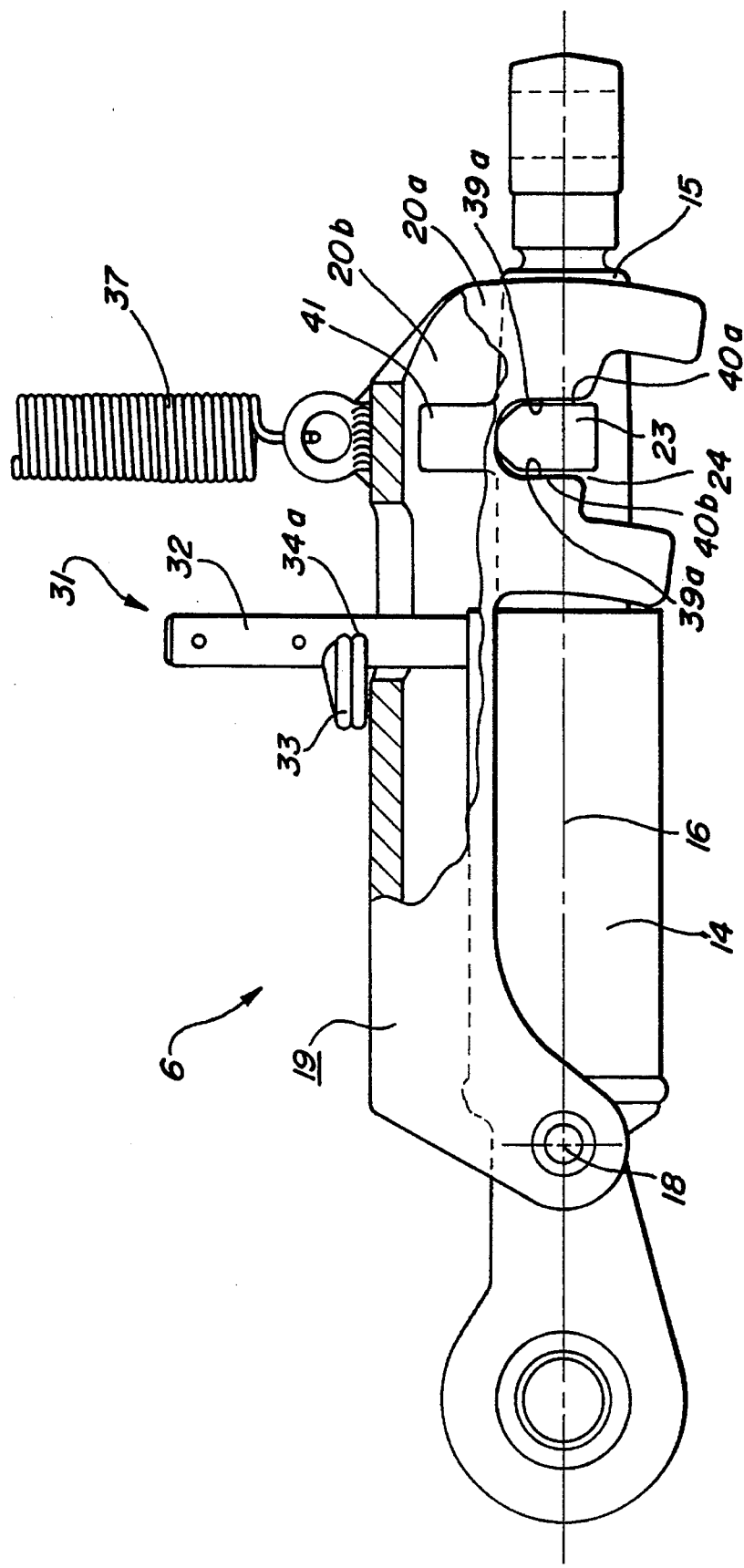
FIG. 5 is a view like FIG. 4 with the locking pawl being in the locking position.
Figure 6:
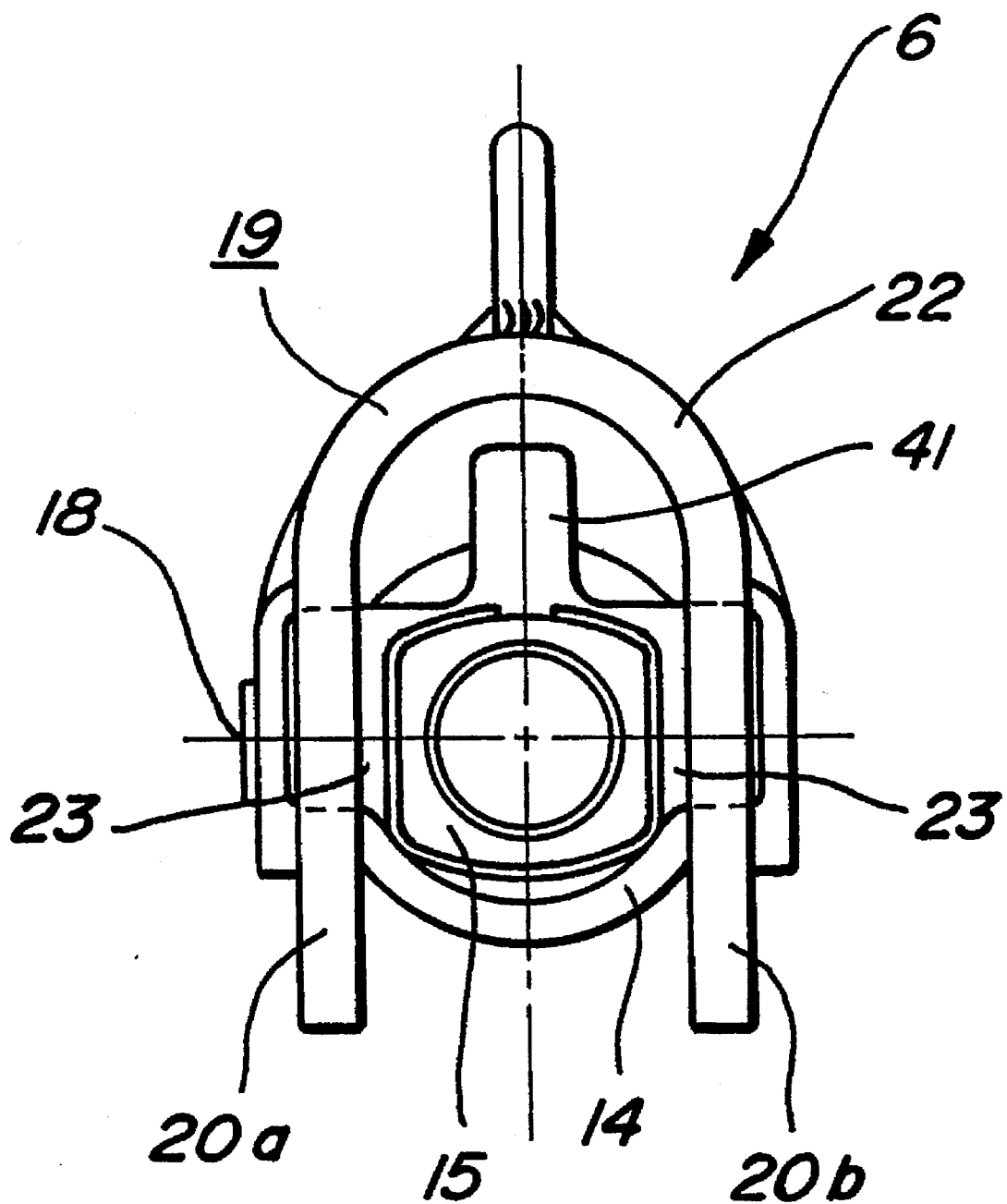
FIG. 6 is an end plan view according to FIG. 5.

In FIG. 5, the side strut 6 is in the locked position. The locking pawl 19 is in the nearest position relative to the two telescopic members 14, 15, with the locking recesses 24 of the two cheeks 20a, 20 form-fittingly embracing the associated locking stops 23. Only a small axial play exists in the direction of the axis of adjustment 16. It can be seen that in this position, the side faces 39a and 39b of the locking recess 24 extend parallel to the contact faces 40a, 40 of the locking stop 23, with any contact being of a planar nature. The locking pawl 19 cannot be moved out of this position by being pivoted around the pin 18, because it is locked by the plug 33 which is inserted into the plug-in bore 34a.

A rotation limiting stop 41 engages between the two cheeks 20a, 20 of the locking pawl 19 projects upwardly from the second telescopic member 15 in the direction of the locking pawl. If the second telescopic member 15 is rotated relative to the first telescopic member 14, the rotation limiting stop acts against such a rotational movement by stopping against the inner faces of the cheeks 20a, 20b.

While the above detailed description describes the preferred embodiment of the present invention, the invention is susceptible to modification, variation, and alteration without deviating from the scope and fair meaning of the subjoined claims.

We claim:

1. A side strut for a lower steering arm of a three-point attaching device of a tractor, comprising:

a first articulating telescopic member secured to the tractor;

a second articulating telescopic member secured to the lower steering arm, said two telescopic members being adjustable relative to one another along an adjustment axis between an inserted position and a maximum extracted position;

a locking pawl pivotally attached to one of the two telescopic members around an axis transverse to the adjustment axis, said locking pawl pivoting between a locking and unlocking position, said pawl including two cheeks, said cheeks positioned parallel to one another and arranged at sides of the two telescopic members and connected to one another by a bridge;

two locking stops extending transversely relative to the adjustment axis, projecting from the other of the two telescopic members and form-fittingly embraced by locking recesses in the cheeks when the locking pawl is in the locking position;

the cheeks of the locking pawl further include one or several extending steps; and a fixing device connected to one of said two telescopic members and extending between said two cheeks and projecting through an aperture in said bridge and the fixing device limits the maximum pivot path of the locking pawl relative to the locking stops.

2. A side strut according to claim 1, wherein said fixing device includes a holding device which is arranged between the two cheeks of the locking pawl, said holding device projects through the aperture in the bridge and is provided with plug-in bores which may be used for inserting a plug, and an outer face of the bridge being made to rest against the plug.

3. A side strut according to claim 1, wherein in the respective locking and unlocking positions of the locking pawl and the locking stops relative to one another, side faces of the locking recesses extend parallel to opposed contact faces of the locking stops.

4. A side strut according to claim 1, wherein the other telescopic member is provided with a rotation limiting stop projecting into a space between the two cheeks of the locking pawl.

* * * * *